(12) United States Patent
Ujma et al.

(10) Patent No.: US 6,527,539 B1
(45) Date of Patent: Mar. 4, 2003

(54) INJECTION UNIT OF AN INJECTION SYSTEM

(75) Inventors: Andreas Ujma, Herfalben (DE); Pierre Glaesener, Bissen (LU)

(73) Assignee: Husky Injection Molding Systems, Ltd., Bolton (CA)

( * ) Notice: Subject to any disclaimer, the term of this patent is extended or adjusted under 35 U.S.C. 154(b) by 155 days.

(21) Appl. No.: 09/696,074

(22) Filed: Oct. 25, 2000

(51) Int. Cl.⁷ .............................................. B29C 45/78
(52) U.S. Cl. ........................ 425/557; 425/585; 425/542
(58) Field of Search .............................. 425/557, 558, 425/559, 560, 561, 585, 586, 587, 542

(56) References Cited

U.S. PATENT DOCUMENTS

| | | | |
|---|---|---|---|
| 2,950,501 A | | 8/1960 | Harkenrider ................ 425/146 |
| 4,078,875 A | * | 3/1978 | Eckardt ................ 264/DIG. 83 |
| 5,071,341 A | * | 12/1991 | Poehlsen ................ 264/328.19 |
| 5,192,555 A | * | 3/1993 | Arnott ...................... 264/297.2 |
| 5,409,659 A | * | 4/1995 | Matsumoto et al. ... 264/328.12 |
| 5,814,358 A | | 9/1998 | Bock .......................... 425/557 |
| 5,858,420 A | * | 1/1999 | Szajak et al. ................ 425/557 |

* cited by examiner

Primary Examiner—Jan H. Silbaugh
Assistant Examiner—Joseph S. Del Sole
(74) Attorney, Agent, or Firm—Katten Muchin Zavis Rosenman

(57) ABSTRACT

A injection unit (10) of an injection system, including a shooting pot (12) having a shooting pot head (13) at one end, defining a melt chamber (14) therein; a melt inlet channel (16) for laterally bringing melt into the melt chamber (14); a plunger (26) arranged in the melt chamber (14), the plunger (26) being linearly moveable from a retracted position into an extended position, so as to force melt accumulated in the melt chamber (14) through a melt outlet channel (20) arranged in said shooting pot head (13) into an injection mold; an annular melt passage (28) provided between the melt chamber (14) and the plunger (26), for allowing the melt to flow from the melt inlet channel (16) to an outlet end (18) of the melt chamber (14); and a melt distribution channel (30) for distributing the melt from the melt inlet channel (16) to the annular melt passage (28). An important aspect of the invention is that the melt distribution channel (30) be distal from the melt inlet channel (16) so as to ensure even distribution of the melt to the annular melt passage (28).

15 Claims, 5 Drawing Sheets

INJECTION UNIT OF AN INJECTION SYSTEM

FIELD OF THE INVENTION

The present invention relates to an injection unit of an injection system of an injection molding machine, in particular of a two stage injection system.

BACKGROUND OF THE INVENTION

An injection molding machine comprises an injection system, a mold and a press. The injection system provides essentially two functions during the course of a normal cycle of operation; namely, extruder and injection. In a standard reciprocating screw injection unit, the extruder function is accomplished when the screw is rotated, gradually moving plastic melt toward the forward end of the screw, thereby creating a force to move the screw rearward to its pre-injection position as the melt accumulates. When the desired amount of melt, generally called a shot, is accumulated, the screw is rapidly moved forward (without rotation) to inject the melt straight into the mold, thus performing the injection function. This can however involve quite substantial wear of the screw, especially in case of big injection molding machines.

The injection system can also be designed as a "two-stage" system, where the extruder and injection functions are performed by separate machine elements; namely a plasticizing unit and an injection unit. The plasticizing unit comprises a feed screw in a heated barrel for performing the extruder function. The plastic melt is diverted into an injection chamber of the injection unit rather than being conveyed from the barrel directly to the mold cavity. An injection ram is subsequently operated in the injection chamber to perform the injection of the plastic melt into the mold. The advantages of such a two-stage injection system include more uniform plastification of material and reduced wear on the screw and barrel. Due to the fact that the material is plasticized in a continuous process, the melt obtained is less liable to degradation.

However, a major disadvantage of such an injection system is the material carryover from shot-to-shot. Indeed, some of the plastic melt remains in the injection chamber of the injection unit after injection. This causes major problems, especially if the plastic melt remains in the injection chamber for several cycles. The longer it remains in the injection chamber, the longer it is being held at a high temperature and the more it degrades. Although the amount of plastic material remaining in the injection chamber can be minimized through the construction of the injection chamber, it cannot be prevented. Furthermore, the material carryover from shot-to-shot causes color changes to be extremely slow and expensive. Lots of material is wasted during the cleaning of the injection chamber.

These disadvantages can be avoided by using a FIFO-injection system (first in-first out), wherein the melt first transferred into the injection chamber will be the melt first escaping through the injection nozzle. FIFO-injection systems ensure that the melt remaining in the injection chamber after one cycle will be the first melt to be shot out during the following cycle.

U.S. Pat. No. 2,950,501 describes an injection cylinder of such a FIFO-injection system. The injection cylinder has a shell with a bore therein, defining an injection chamber. One end of the shell has a passage therethrough communicating with an injection nozzle. An injection ram is adapted to reciprocate within the bore. The bore is of a diameter larger than the diameter of the injection ram, thus providing an annular channel to permit the flow of plasticized material between the ram and the cylinder wall. The bore is provided with an annular recess or pooling area adjacent and in communication with an opening laterally arranged in the shell for leading plasticized material from a plasticizing unit into the injection chamber. As soon as one injection stroke has been performed, filling of the injection cylinder commences. While the injection ram is still in its extended position, plasticized material enters the injection cylinder through the lateral opening and fills the annular recess, which distributes it around the circumference of the injection ram. The material is then forced in an annular film through the annular channel towards the discharge end. By doing so, it pushes the material remaining from the previous, injection stroke ahead. As the plasticized material accumulates near the discharge end, the injection ram is pushed rearwardly. However, as the plasticized material is laterally forced into the injection cylinder, an important radial force is exerted onto the injection ram, which can result in the tilting of the latter. The annular film flowing toward the discharge end will then have different thickness, around the circumference of the injection ram. This may create dead zones, in which the material flow is limited or even prevented. Material remaining in the injection chamber from one cycle is not necessarily pushed ahead by freshly in flowing material during the following cycle. Depending on the construction of the injection cylinder, and the force with which plasticized material is forced into the injection cylinder, it is also possible for the injection ram to become jammed in the injection chamber. Frictional forces of the ram on the injection chamber walls can result in damage to the ram and hence in premature maintenance work being necessary, or even in the seizing of the injection ram.

U.S. Pat. No. 5,814,358 discloses an injection molding cylinder that comprises a housing with a cylindrical longitudinal bore, in which a sleeve is longitudinally displaceably arranged. The outside diameter of the sleeve and the inside diameter of the longitudinal bore are such that an annular gap remains between the sleeve and the longitudinal bore. An ejection piston is axially displaceable within the sleeve and has an outside diameter which is slightly smaller than the inside diameter of the sleeve, so that an annular gap remains between the ejection piston and the inside peripheral surface of the sleeve. The internal space delimited by the sleeve is the storage space for the plastic material to be introduced in an injection molding tool. The sleeve is connected to a second piston, which can move the sleeve so as to open or close plastic material in and outlets. In a first position, the inlet is open, whereas the outlet is closed; in a second position, the outlet is open, whereas the inlet is closed. In its first position, the sleeve allows plastic material to be introduced into the storage space. On its outside peripheral surface, the sleeve is provided with a distributor passage, which is arranged to extend substantially around the periphery of the sleeve but extending inclinedly relative to the longitudinal axis of the sleeve. When the sleeve is in its first position, one apex region of the distributor passage is disposed opposite the mouth opening of the feed conduit. Starting from that apex region, the distributor passage extends at an acute angle relative to the longitudinal axis of the housing and thus the sleeve at both sides of the latter towards a second apex region of the distributor passage. The second apex region is arranged in displaced relationship with respect to the first apex region, in a direction towards a free end of the sleeve. Adjoining the distributor passage is the annular gap between the sleeve and the longitudinal bore. The distributor passage distributes the plastic material supplied from the feed conduit over the periphery of the sleeve. The plastic material is then forced towards the free end of the sleeve, where it enters the storage space. After filling of the storage space, the sleeve is displaced in its second position, in which it allows the plastic material accumulated in the storage space to be forced into the injection molding tool by the ejection piston. This injection molding cylinder has the disadvantage that the plastic material has a very long way to travel from the mouth of the feed conduit to the storage space. As the plastic material has to squeeze through a rather long narrow channel, the pressure at the mouth of the feed conduit must be very high. Furthermore, the sleeve design of the injection molding cylinder is very complex and therefore rather expensive.

OBJECT OF THE INVENTION

The object of the present invention is to provide a FIFO-injection unit that does not suffer from the above-described disadvantages. Such an injection unit is defined herein.

GENERAL DESCRIPTION OF THE INVENTION

In order to overcome the abovementioned problems, the present invention provides an injection unit of an injection system, comprising
- a shooting pot and a shooting pot head arranged at an outlet end of the shooting pot, defining a melt chamber therein;
- a melt inlet channel for laterally bringing melt into the melt chamber;
- a plunger arranged in the melt chamber, the plunger being linearly moveable from a retracted position into an extended position, so as to force melt accumulated in the melt chamber through a melt outlet channel arranged in the shooting pot head into an injection mold;
- an annular melt passage provided between the melt chamber and the plunger, for allowing the melt to flow from the melt inlet channel to the outlet end; and a melt distribution channel for distributing the melt from the melt inlet channel to the annular melt passage. An important aspect of the invention is that the melt distribution channel tapers towards an apex of the melt distribution channel distal from the melt inlet channel so as to ensure even distribution of the melt to the annular melt passage. Melt is evenly distributed over the periphery of the plunger by the melt distribution channel. Dead zones, in which the melt flow is limited or even prevented, cannot occur as the melt travels through the annular melt passage at the same velocity. The melt distribution channel directs the melt directly towards the outlet end of the melt chamber, thereby ensuring that the traveling path of the melt from the melt inlet channel to the outlet end of the melt chamber is short. The pressure with which the melt is pushed through the melt inlet channel does hence not have to be very high. Furthermore, the design of the injection unit is rather simple and therefore not overly expensive.

According to a preferred embodiment, the injection unit comprises
- a first melt inlet channel and a second melt inlet channel for laterally bringing melt into the melt chamber;
- a first melt distribution channel for distributing the melt from the first melt inlet channel to the annular melt passage; and
- a second melt distribution channel for distributing the melt from the second melt inlet channel to the annular melt passage. The introduction of melt into, the melt chamber through two separate melt inlet channels allows reducing the size of the melt distribution channels. More importantly, it provides an even better distribution of melt around the plunger by balancing the forces on the, plunger, so that the latter is prevented from tilting. Jamming of the plunger in the melt chamber can hence not occur.

The melt distribution channel, which is preferably a semicircular groove, can either be arranged in the shooting pot or in an insert arranged in the shooting pot. A distinct advantage of the insert is that it can be removably arranged in the shooting pot. This enables inserts with slightly different shapes of distribution channels to be installed if need be. A particular shape of channel might e.g. be more suitable for a particular type of plastic material.

It is of advantage to provide the annular melt passage with a narrowing towards the front end of the melt chamber. Such a narrowing increases the velocity of the melt in this part of the annular melt passage, thereby providing a more efficient cleaning of the passage. This means that in this region, virtually no melt can get stuck against the peripheral walls of either the shooting pot, resp. shooting pot head, or the plunger.

According to one embodiment, the narrowing is formed by an annular protrusion radially arranged near the front end of the plunger. Being fixed to the plunger, the protrusion travels rearward with the plunger as melt accumulates in the outlet end of the melt chamber. The narrowing of the annular melt channel hence also travels along the melt chamber. A large portion of the peripheral wall of the shooting pot is cleaned by the local increase in melt velocity.

According to another embodiment, the narrowing is formed by a widening of a portion of the annular melt passage directed towards the melt inlet channel. There is hence no need for the plunger to comprise an annular protrusion. This widening can either be arranged in the shooting pot itself, or in an insert placed in the shooting pot.

The melt distribution channel can be arranged either towards the rear end of the melt chamber or towards the front end of the melt chamber. Arranging the melt distribution channel towards the front end of the melt chamber, has the advantage that the annular melt passage can be further reduced. It also enables to reduce the overall size of the injection system, as the plasticizing unit can be mounted closer to the mold.

The front end of said plunger advantageously has a conical head, wherein the shooting pot head has a corresponding shape. This ensures that no dead spaces occur in the front portion of the melt chamber. Although it is possible for the plunger head and the shooting pot head to have the same shape, i.e. both having the same degree of tapering, it is of advantage to design them so that the tapering of the shooting pot head is more acute than the tapering of the plunger head. When the plunger is in its fully extended position, the annular gap between the plunger head and the shooting pot head is wider near the melt outlet channel. This ensures that the melt velocity in the outlet end is constant, even though the diameter of the annular melt passages becomes smaller due to the conical shape of both the plunger head and the shooting pot head.

A valve is preferably associated with the melt inlet channel for opening or closing the melt inlet channel. This valve can e.g. be a spring-loaded non-return valve for quicker and more accurate closing of the melt inlet channel.

Another valve is preferably associated with the melt outlet channel for opening or closing the melt outlet channel. The melt inlet channel can hence be closed when the plunger ejects melt through the melt outlet channel. Melt is prevented from flowing back towards the plasticizing unit. During the filling of the melt chamber, the valve associated with the melt outlet channel can be closed, so that the melt flowing into the melt chamber accumulates therein and pushes the plunger rearwardly.

DETAILED DESCRIPTION WITH RESPECT TO THE FIGURES

The present invention will be more apparent from the following description of some not limiting embodiments with reference to the attached drawings, wherein:

FIG. 1 schematically shows a first embodiment of an injection unit according to the invention;

Figure 1:
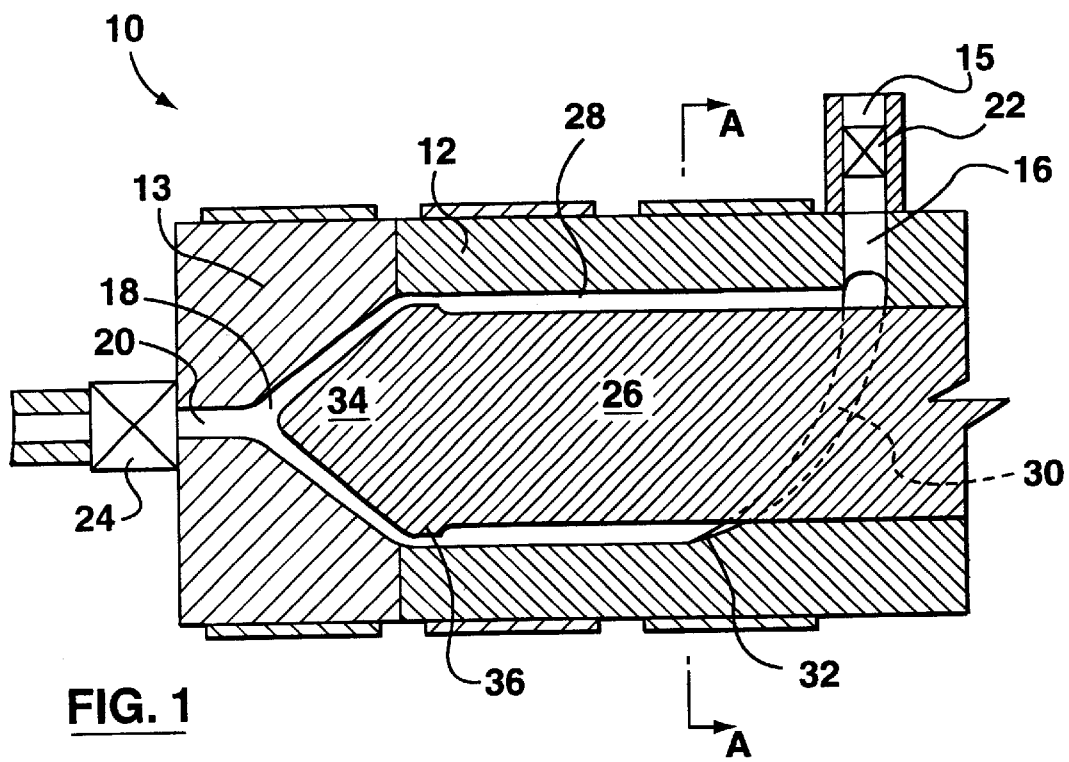

FIG. 1 schematically shows an injection unit 10 of an injection system. Such an injection unit 10 comprises a shooting pot 12 and a shooting pot head 13, defining a melt chamber 14 therein. The shooting pot head 13 is removably connected to the shooting pot 12 by press fit. Melt is brought from a plasticizing unit (not shown) into the melt chamber 14 through a melt feed channel 15 and a melt inlet channel 16 laterally arranged in the shooting pot 12. A melt outlet channel 20 is arranged in the shooting pot head 13 for injecting the melt from the melt chamber 14 (see FIGS. 6 and 7) into an injection mold (not,shown). Both the melt feed channel 15 and the melt outlet channel 20 have a Valve 22, 24 associated therewith for closing the respective melt channels 15, 20. A plunger 26, arranged in the melt chamber 14, is linearly moveable from a retracted position into an extended position, so as to force melt accumulated in the melt chamber 14 through the melt outlet channel 20 into the injection mold. Between the melt inlet channel 16 and the outlet end 18 of the melt chamber 14, the plunger 26 has a smaller diameter than the melt chamber 14, so as to provide an annular melt passage 28 therebetween for allowing the melt to flow from the melt inlet channel 16 to the outlet end 18. The injection unit 10 further comprises a melt distribution channel 30 for distributing the melt from the melt inlet channel 16 to the annular melt passage 28. The melt distribution channel 30 tapers towards an apex 32 of the melt distribution channel 30 distal from the melt inlet channel 16 so as to ensure even distribution of the melt to the annular melt passage 28. The plunger 26 has a conical head 34, the shooting pot head 13 having a corresponding shape. The tapering of the shooting pot head 13 is more acute than the tapering of the plunger head 34, so as to maintain a constant velocity of the melt in the outlet end 18 and thereby reduce the amount of melt remaining in the melt chamber 14 after an injection stroke. The plunger 26 further comprises an annular nose 36 at its front end for reducing the size of the annular melt passage 28. This increases the velocity of the melt at this point and hence further reduces melt accumulation.

Figure 2:
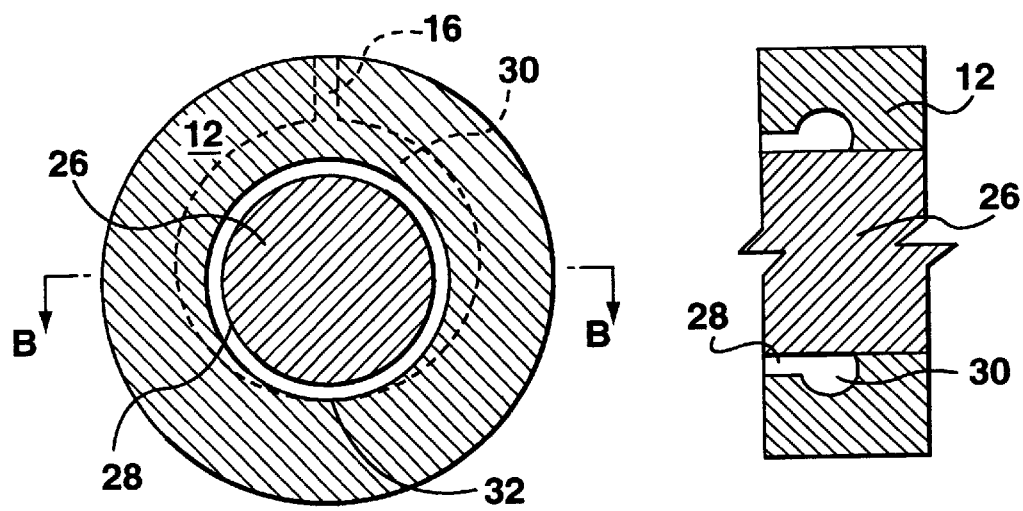
FIG. 2 shows a section view along line A—A of FIG. 1.

FIG. 2, which shows a cut along line A—A of FIG. 1, illustrates the tapering of the distribution channel 30.

Figure 3:
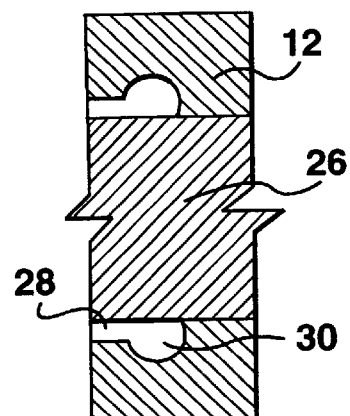
FIG. 3 shows a section view along line B—B of FIG. 2.

FIG. 3 is a cut along line B—B of FIG. 2. It shows the melt distribution channel 30 as being a semicircular groove arranged in the shooting pot 12. Because the cross-section of the melt distribution channel 30 tapers as it gets further away from the melt inlet channel 16, the melt is forced from the semicircular groove into the adjoining annular melt passage 28.

Figure 4:
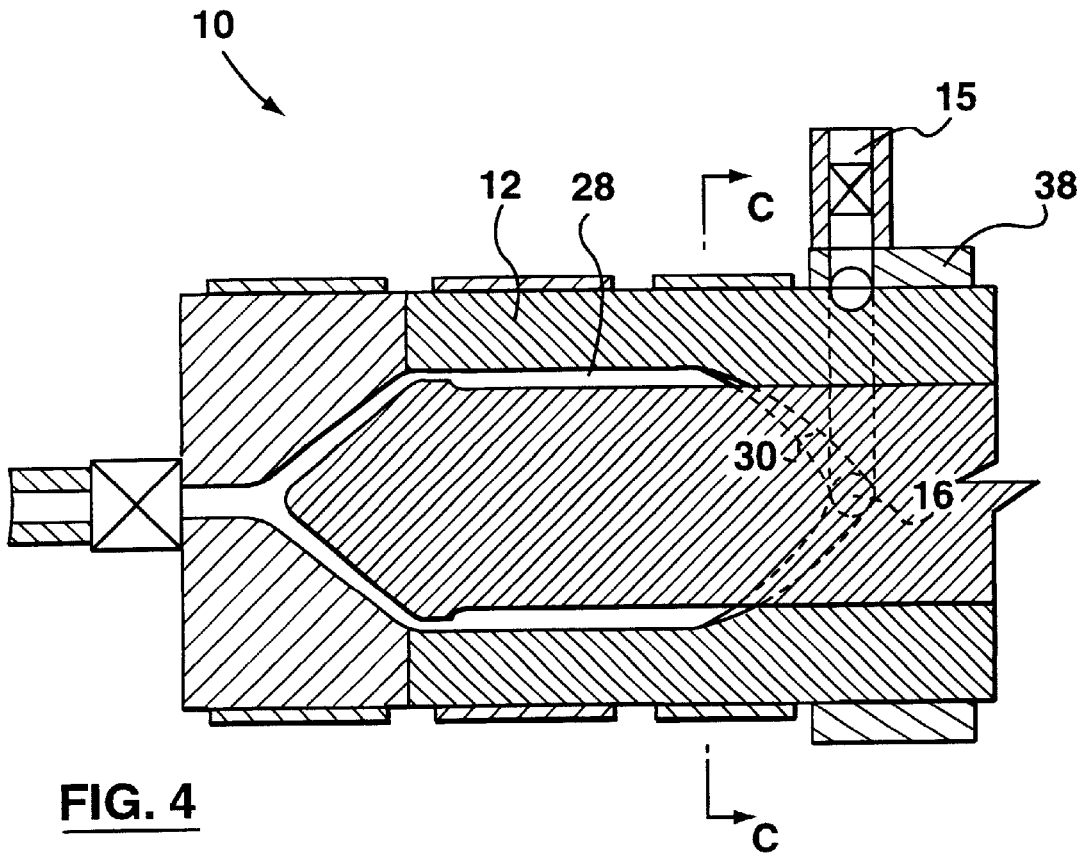
FIG. 4 shows a second embodiment of an injection unit according to the invention.
Figure 5:
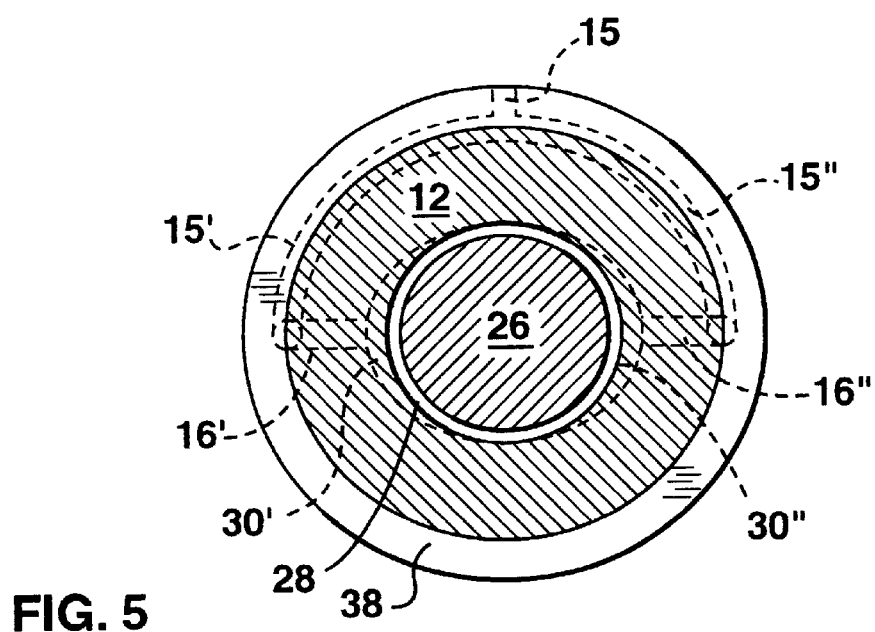
FIG. 5 shows a section view along line C—C of FIG. 4.

A second embodiment of the injection unit is shown in FIG. 4. The same reference signs have been used wherever they relate to the same elements. The difference of this embodiment, with respect to the one shown in FIG. 1, lies in that the melt feed channel 15 is divided into a first and a second melt feed channel 15', 15". The first and second melt feed channels 15', 15" are formed by a groove arranged in the outer surface of the shooting pot 12 and a ring element 38 surrounding the shooting pot 12. The first and second melt feed channels 15', 15" distribute the melt to a first and a second melt inlet channel 16', 16", which lead the melt through the shooting pot 12 to respective melt distribution channels 30', 30". A first melt distribution channel 30' distributes melt from the first melt inlet channel 16' to the annular melt passage 28; whereas a second melt distribution channel 30" distributes melt from the second melt inlet channel 16" to the annular melt passage 28. This can be seen more clearly on FIG. 5, which shows a cut along line C—C of FIG. 4. The first and second melt inlet channels 16', 16" are opposite each other, whereby any radial force exerted on the plunger by the melt entering through one melt inlet channel is balanced by the same radial force in the opposite direction by the melt entering through the other melt inlet channel. The net radial force on the plunger is hence negligible.

FIGS. 6 to 9 show further embodiments of the injection unit 10, wherein the shooting pot 12 of the injection unit 10 comprises an insert 40 at its front end. The shooting pot head 13 can be detached from the shooting pot 12, so that the insert 40 can be removed from the shooting pot 12. The first and second melt feed channels 15', 15" extend through the shooting pot 12 to the insert 40. Melt inlet channels 16', 16" lead the melt through the insert 40 into the melt chamber 14. The melt inlet channels 16', 16" could be at an angle, so as to direct the inflowing melt in the right direction, i.e. towards the outlet end 18 of the melt chamber 14. The melt distributor channels 30', 30" are arranged in the insert 40 and lead the melt into the annular melt passage 28 between the plunger 26 and the insert 40, resp. the shooting pot's front portion 42. The insert 40 comprises an annular depression 44, so as to widen the annular melt passage 28. The narrowing of the annular melt passage 28 hence occurs where the annular depression 44 ends. The annular depression 44 can be arranged in such a way that it can further influence the pressures exerted on the plunger 26. The length of the distribution channels 30', 30" can hence be further reduced. Such an arrangement is drawn in FIG. 7. Furthermore, there is no need for an annular nose 36 on the front end of the plunger 26.

Figure 6:
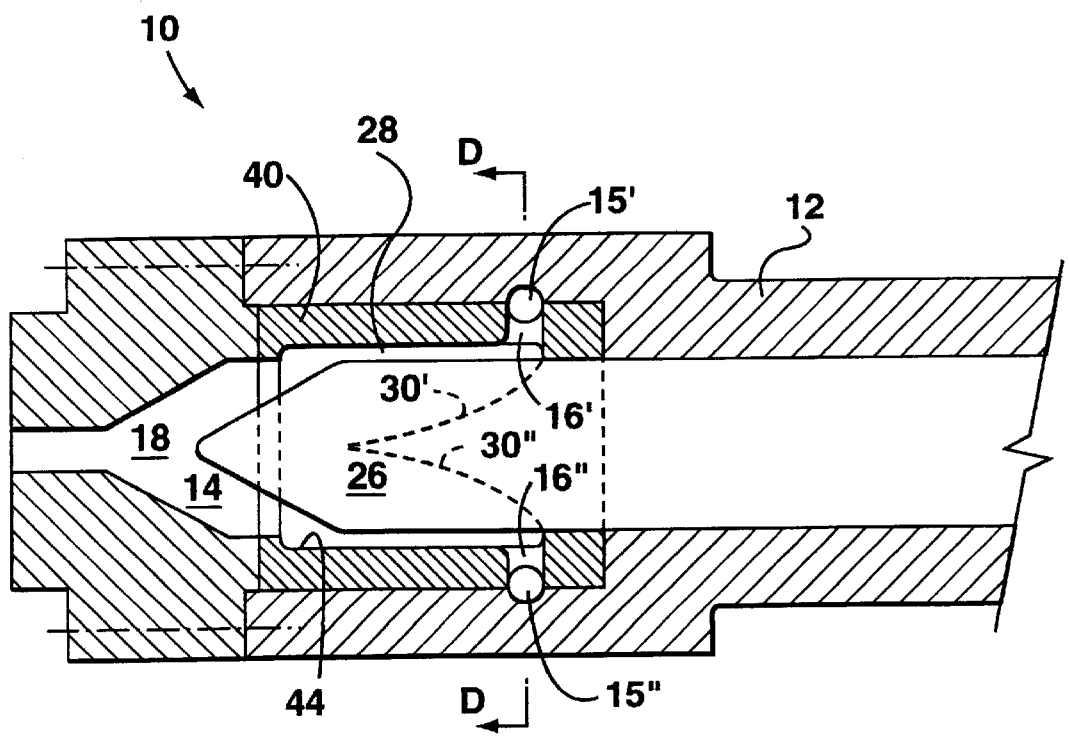
FIG. 6 shows a third embodiment of an injection unit according to the invention.
Figure 7:
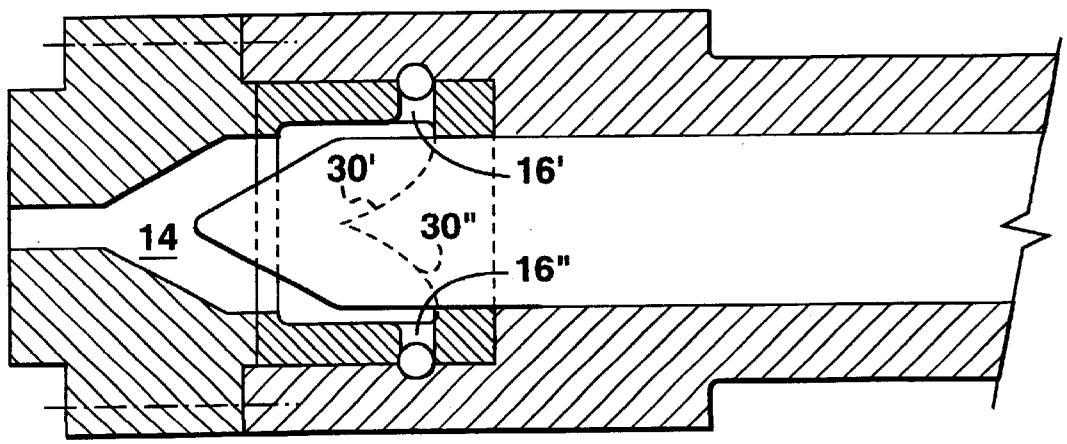
FIG. 7 shows a fourth embodiment of an injection unit according to the invention.

The annular depression 44 of the insert 40 shown in FIGS. 6 and 7 is arranged so that the end of the annular depression 44 lies in a plane that is perpendicular to the axial direction of the injection unit 10. The end of the annular depression 44 in the insert 40 shown in FIG. 8 does not lie in such a plane. In fact, the end of the annular depression 44 is rounded and extends, at its radial points furthest away from the melt inlet channels 16', 16", towards the outlet end. This allows further influencing of the pressures on the plunger 26. FIG. 9 shows the inejection unit 10 of FIG. 8 with its plunger 26 in its retracted position.

Figure 8:
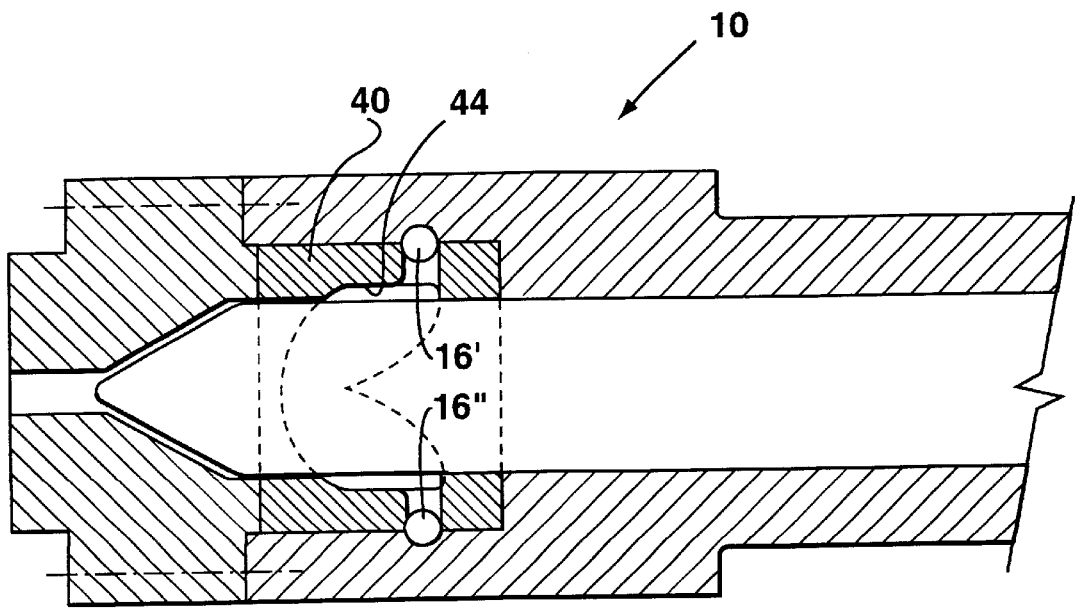
FIG. 8 shows a fifth embodiment of an injection unit according to the invention.
Figure 9:
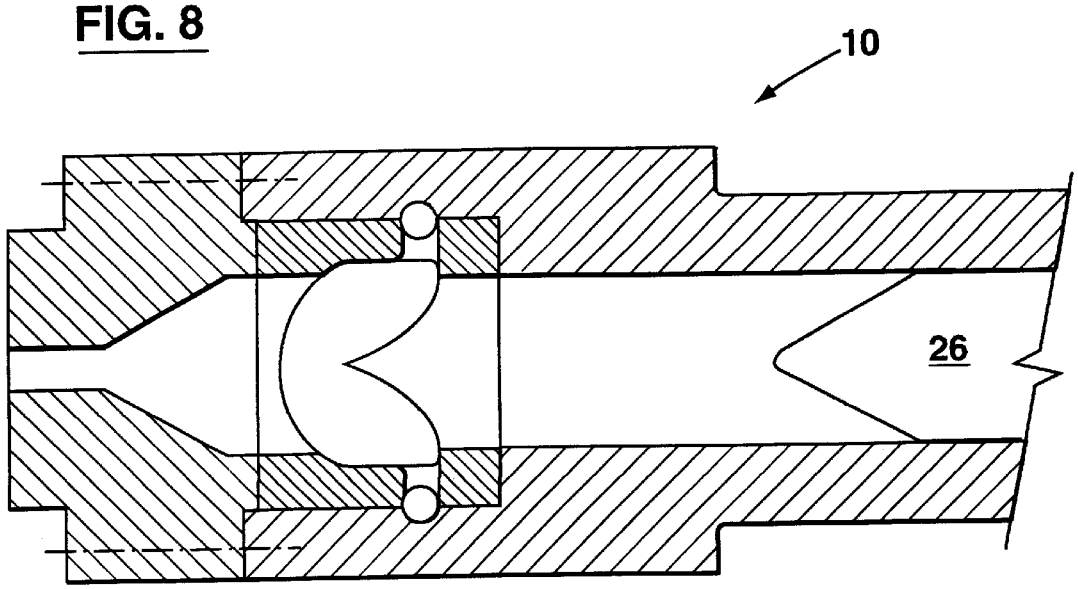
FIG. 9 shows the injection unit of FIG. 10 with its plunger in the retracted position.
Figure 10:
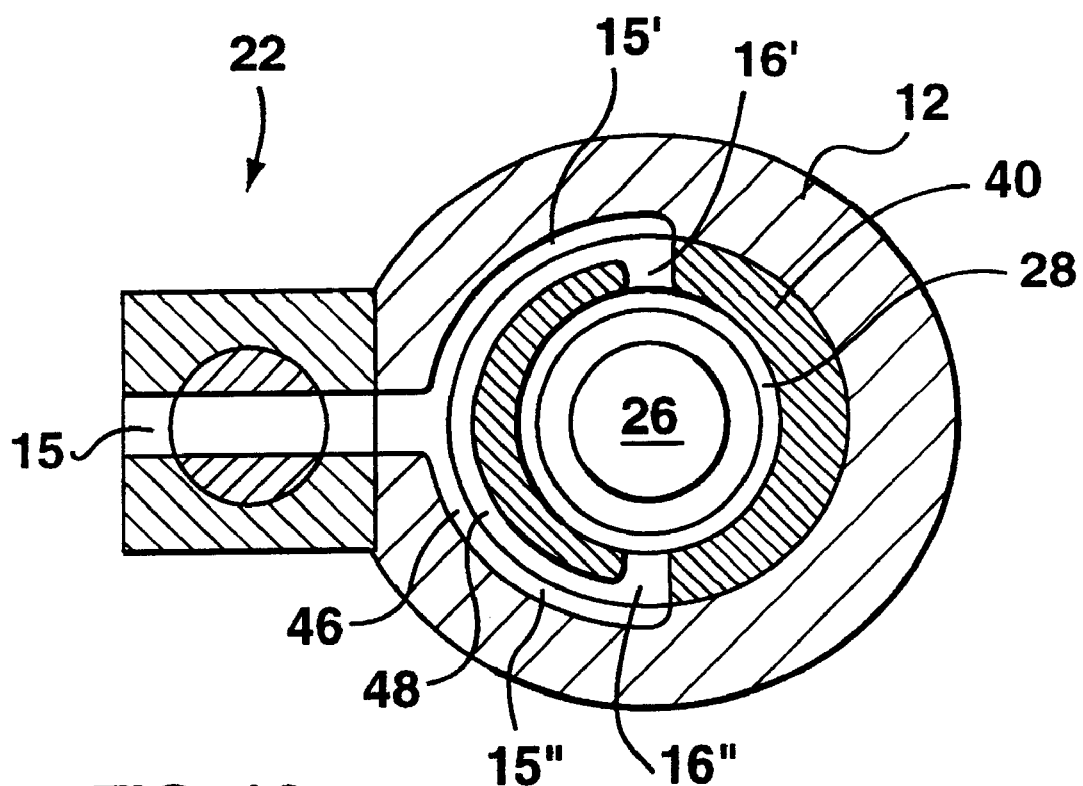
FIG. 10 shows a section view along line D—D of FIG. 6 and a valve.

The melt feed and inlet channels 15', 15", 16', 16" of the embodiments shown in FIGS. 6 to 9 are more clearly seen on FIG. 10, which is a cut along line D—D of FIG. 6. The melt feed channel 15 leads melt from a plasticizing unit (not shown) through the shooting pot 12 to the insert 40. It is then divided into a first and a second melt feed channel 15', 15" formed by two grooves, one 46 arranged in the inner surface of the shooting pot 12, the other 48 arranged in the outer surface of the insert 40. The first and second melt feed channels 15', 15" then turn into respective melt inlet channels 16', 16", which lead the melt into the annular melt passage 28 around the plunger 26.

FIG. 8 also shows one possible embodiment of the valve 22 associated with the melt feed channel 15. The valve 22 is a cylinder valve and can also be used as valve 24 associated with the melt outlet channel 20.

Figure 11:
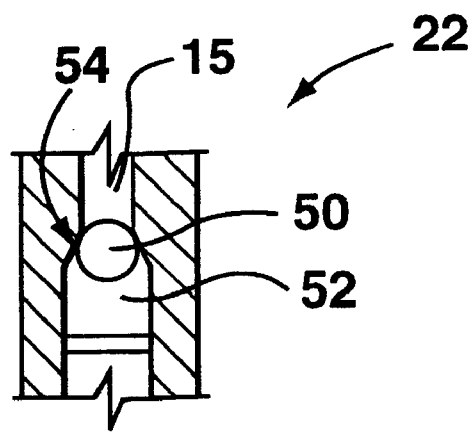
FIG. 11 shows another embodiment of a valve.

Another embodiment of the valve 22 is shown in FIG. 11. This non-return valve 22 comprises a spring-loaded valve ball 50 movable in a valve chamber 52. Melt trying to flow back up towards the plasticizing unit will push the valve ball 50 onto its seat 54, thereby closing the melt feed channel 15.

It will be appreciated that in all above embodiments, there is only a slight difference in diameter between the melt chamber and the plunger from the melt inlet channel rearwards, so as to avoid melt being pushed out at the rear end of the injection unit.

What is claimed is:

1. An injection unit of an injection system, comprising a shooting pot and a shooting pot head arranged at an outlet end of said shooting pot, defining a melt chamber therein;

a melt inlet channel for laterally bringing melt into said melt chamber;

a plunger arranged in said melt chamber said plunger being linearly moveable from a retracted position into an extended position, so as to force melt accumulated in said melt chamber through a melt outlet channel arranged in said shooting pot head into an injection mold;

an annular melt passage provided between said melt chamber and said plunger, for allowing said melt to flow from said melt inlet channel to said outlet end; and a melt distribution channel formed on inner surfaces of said shooting pot for distributing said melt from said melt inlet channel to said annular melt passage, characterized in that said melt distribution channel tapers towards an apex of said melt distribution channel distal from said melt inlet channel so as to ensure even distribution of said melt to said annular melt passage.

2. The injection unit according to claim 1, wherein said injection unit comprises a first melt inlet channel and a second melt inlet channel for laterally bringing melt into said melt chamber;

a first melt distribution channel for distributing said melt from said first melt inlet channel to said annular melt passage; and a second melt distribution channel for distributing said melt from said second melt inlet channel to said annular melt passage.

3. The injection unit according to any one of claims 1 or 2, wherein said melt distribution channel is a groove arranged in said shooting pot.

4. The injection unit according to any one of claims 1 or 2, wherein said melt distribution channel is a groove arranged in an insert, said insert being arranged in said shooting pot.

5. The injection unit according to claim 4, wherein said insert is removably arranged in said shooting pot.

6. The injection unit according to claim 1, wherein said groove is a semicircular groove.

7. The injection unit according to claim 1, wherein said annular melt passage comprises a narrowing.

8. The injection unit according to claim 7, wherein said narrowing is formed by annular protrusion radially arranged at the front end of said plunger.

9. The injection unit according to claim 7, wherein said narrowing is formed by a widening of a portion of said annular melt passage directed towards said melt inlet channel.

10. The injection unit according to claim 1, wherein said melt distribution channel is arranged towards the rear end of said melt chamber.

11. The injection unit according to claim 1, wherein said melt distribution channel is arranged towards the front end of said melt chamber.

12. The injection unit according to claim 1, wherein a front end of said plunger has a conical head and wherein said shooting pot head has a corresponding shape.

13. The injection unit according to claim 1, wherein a valve is associated with said melt inlet channel for opening or closing said melt inlet channel.

14. The injection unit according to claim 13, wherein said valve is a non-return valve.

15. The injection unit according to claim 1, wherein a valve is associated with said melt outlet channel for opening or closing said melt outlet channel.

* * * * *